United States Patent [19]

Shariff et al.

[11] 4,180,845

[45] Dec. 25, 1979

[54] CONTROL CENTER WITH BUS BAR INSULATORS

[75] Inventors: Sadiq A. Shariff, Palos Park; Brij M. Bharteey, Bolingbrook; Neal E. Rowe, Oak Forest, all of Ill.

[73] Assignee: Westinghouse Electric Corp., Pittsburgh, Pa.

[21] Appl. No.: 831,718

[22] Filed: Sep. 9, 1977

[51] Int. Cl.² .............................................. H02B 1/04
[52] U.S. Cl. .................................. 361/334; 174/72 B; 174/99 B; 174/133 B; 174/171; 361/356; 361/391; 361/361
[58] Field of Search ................ 361/334, 356, 358, 361, 361/390, 391, 363; 174/68 B, 72 B, 99 B, 129 B, 133 B, 171

[56] References Cited

U.S. PATENT DOCUMENTS

| 3,096,131 | 7/1963 | Adams | 174/68 B |
| 3,113,820 | 12/1963 | Norden | 174/68 B |
| 3,288,911 | 11/1966 | Grimm | 174/68 B |
| 3,402,254 | 9/1968 | Parker | 174/133 B |
| 4,038,585 | 7/1977 | Wolski | 361/334 |

*Primary Examiner*—Gerald P. Tolin
*Attorney, Agent, or Firm*—L. P. Johns

[57] ABSTRACT

A control center characterized by vertical bus bars supported by dielectric insulators which are disposed in vertically spaced pairs along the bus bars and which are molded with a configuration to accommodate bus bars of various shapes and sizes.

3 Claims, 21 Drawing Figures

CONTROL CENTER WITH BUS BAR INSULATORS

CROSS-REFERENCE TO RELATED APPLICATION

This application is related to the copending application of J. R. Wilson, B. M. Bharteey, and N. E. Rowe, Ser. No. 831,719, filed Sept. 9, 1977.

BACKGROUND OF THE INVENTION

1. Field of the Invention

This invention relates to control centers and more particularly to insulators for insulated bus bars therein.

2. Description of the Prior Art

In a motor control center, the distribution of power by the bus bar system is a vital factor which influences the whole design concept. More specifically, the vertical bus bar distributes power down a vertical stack of motor controllers arranged one on top of the other. Due to the variety of shapes and sizes of bus bars, including the L, Z, flat, and round cross sections, a needless plurality of insulators was required for supporting the bus bars in the desired space relationships. For economy, there has been a need for a bus bar support which may be used universally with bus bars of various shapes and sizes for various short circuit levels with an optimum amount of insulating plastic material and to provide back-to-back connection when using flat, star, or circular bus bars disposed in laterally displaced or nonvertical planes.

SUMMARY OF THE INVENTION

In accordance with this invention it has been found that the problem of supporting various sizes and shapes of bus bars may be overcome by providing a control center for distributing electrical power, comprising a cabinet having a plurality of vertical compartments on the front side of the cabinet, a plurality of vertical, bus bars horizontally spaced in said cabinet, an insulator mounting the bus bars with the surfaces of each bus bar being in surface-to-surface contact with the insulator, the insulator comprising a sheet-like member on opposite sides of the bus bars which members have interfitting portions including a flange-receiving groove in one member and a flange in the other member and extending between each pair of adjacent bus bars, at least one circuit interrupter structure in the compartments and movable transversely into and out of position adjacent to the bus bars, each bus bar comprising a portion disposed in a place aligned with the direction of movement of the circuit interrupter, said structure comprising a contact member engaging the bus bar, each sheet-like member also comprising wall means forming horizontally spaced vertical grooves extending away from the other sheet-like member, the vertical grooves in one sheet-like member being aligned with the vertical grooves of the other member, each pair of aligned grooves forming notch means for holding a bus bar portion, and a bus bar portion in each pair of aligned vertical grooves.

The advantage of the device of this invention is that it provides a universal insulator for vertical bus bars of various shapes and sizes and thereby eliminates the need for providing separate pairs of insulative supports for bus bars of different shapes and sizes.

DESCRIPTION OF THE PREFERRED EMBODIMENTS

Figure 1:
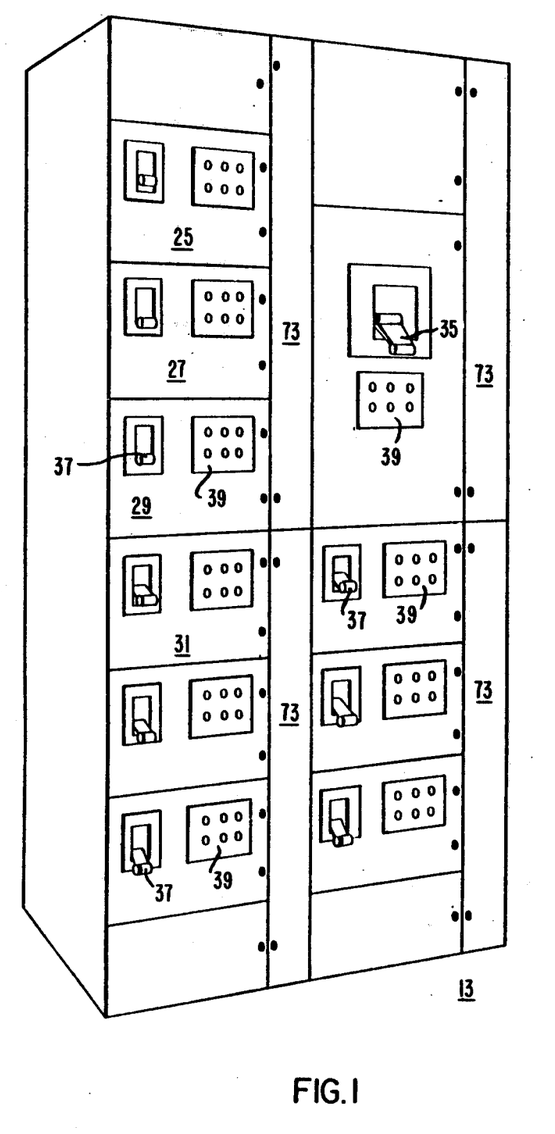
FIG. 1 is a perspective view of an electrical control center in accordance with this invention.
Figure 2:
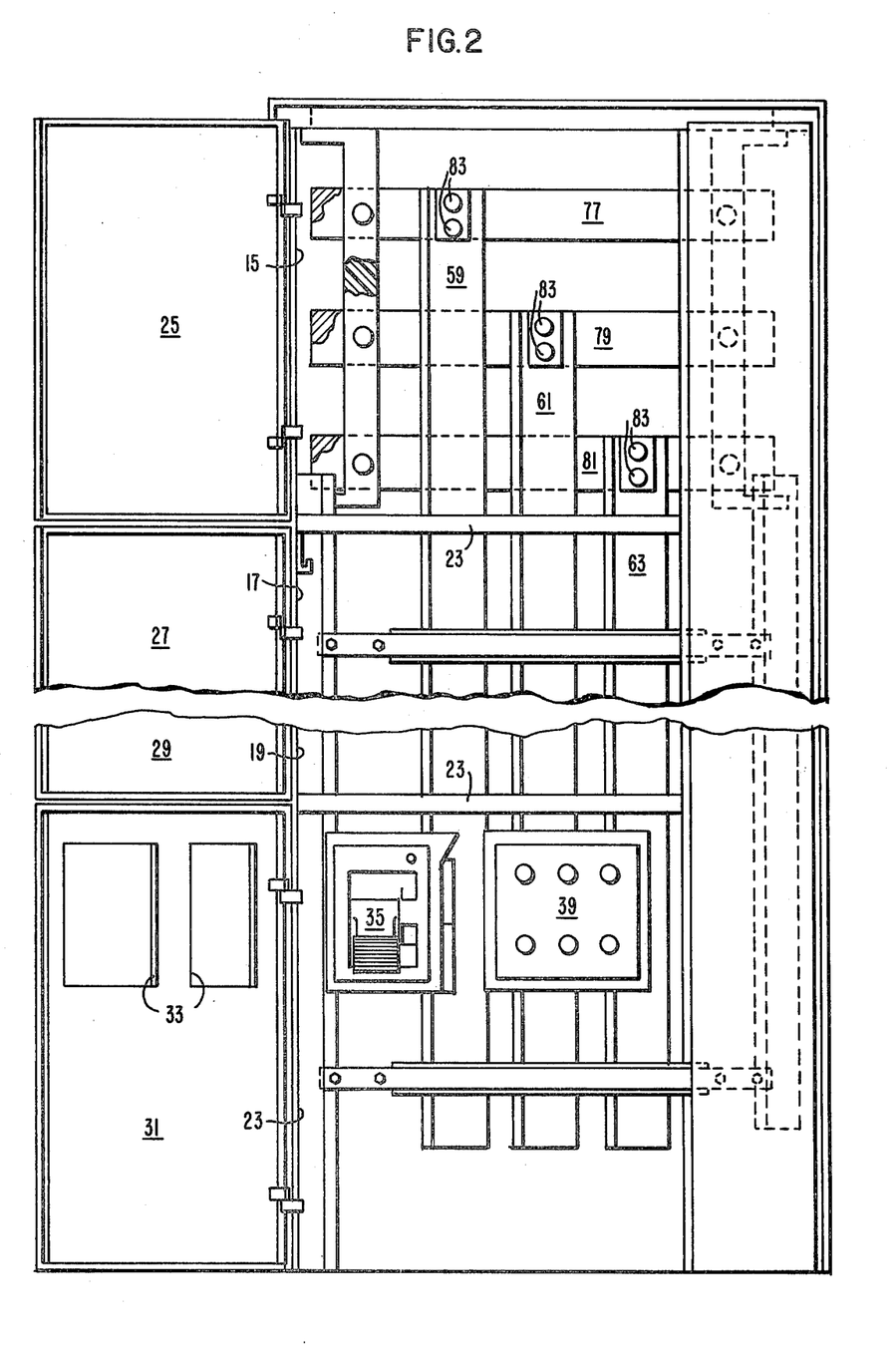
FIG. 2 is a front elevational view of the control center with the front doors open.

The electric control center of this invention is generally indicated at 13 in FIG. 1 and comprises a metal cabinet having a plurality of vertically disposed compartments such as compartments 15, 17, 19, and 21 which are separated by similar horizontal shelves 23, as shown in FIG. 2. Each compartment 15, 17, 19, 21 includes an access door 25, 27, 29, 31, respectively, which doors are provided with or without appropriate openings 33 to accommodate portions of circuit breakers, such as handles 35, 37, or indicator light panel 39 as required.

Figure 3:
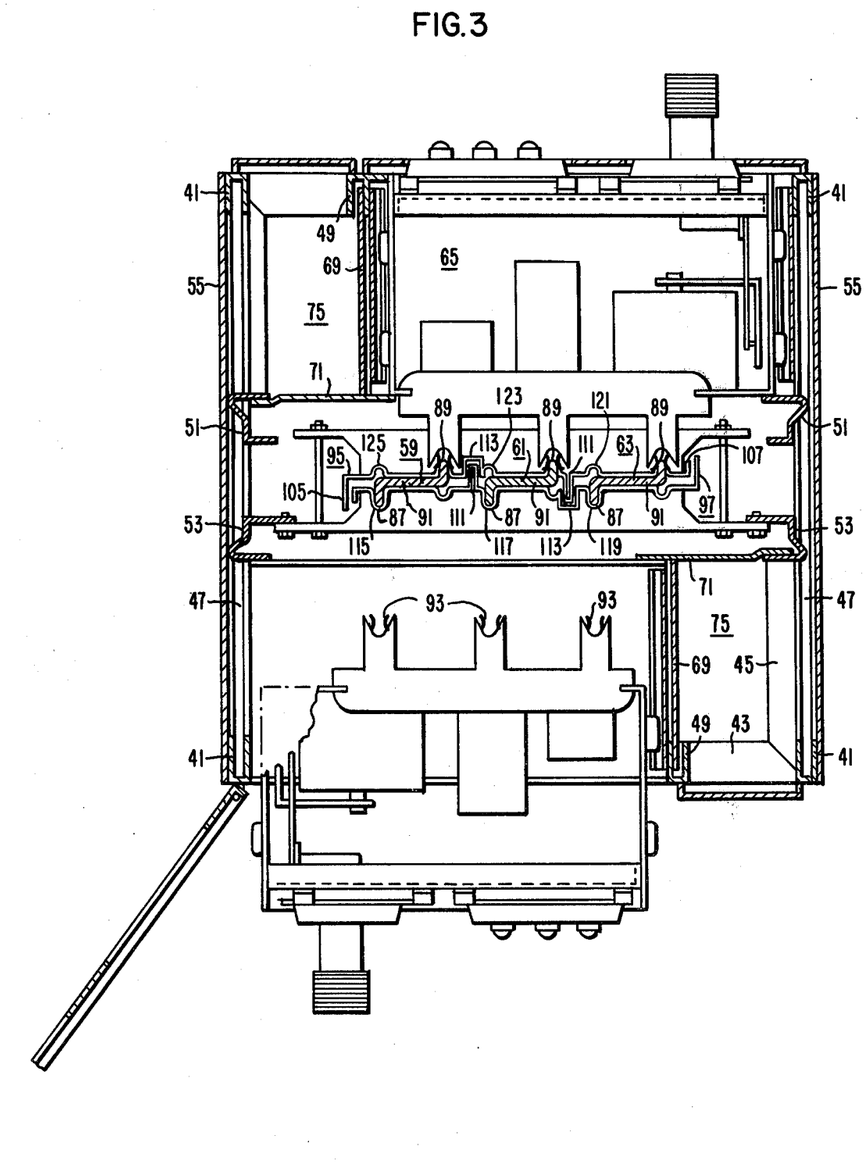
FIG. 3 is a horizontal sectional view taken on the line III—III of FIG. 2, and showing a circuit breaker being inserted in place.

The cabinet 13 includes a rectangular steel framework consisting of U-shaped corner posts 41 (FIG. 3), horizontal interconnectors 43, 45 at upper and lower ends and vertically spaced horizontal braces 47. In addition, the steel framework consists of upright posts 49, one at the front and rear sides of the cabinet 13. A pair of support posts 51 and 53 are also disposed at opposite sides of the cabinet 13 adjacent to opposite wall panels 55 and 57, as shown in FIG. 3.

In the embodiment of the invention disclosed herein, the front and rear sides of the cabinet 13 are provided with compartments similar to compartments 15–21 on the front side in which circuit interrupters 65 may be inserted from opposite sides of vertical bus bars 59, 61, 63 which are centrally disposed between the front and rear sides of the cabinet 13. The cabinet 13 is operative also where the rear side of the cabinet is not adapted for mounting of circuit interrupter 65. Suffice it to say, as shown in FIG. 3, the front side of the cabinet 13 comprises the stacked compartments 15, 17, 19, 21 on the left side of the upright post 49 and a vertically extending compartment 67 between the posts 49, 41. The compartment 67 is separated from the compartments 15–21 by a partition 69 and from the central area of the bus bars by a partition 71. Access to the compartment 67 is provided by a vertical door 73. The compartment 67 extends vertically between the upper and lower ends of the cabinet 13 and is provided for electric wires leading from the several circuit interrupters 65 disposed in the compartments 17, 19, 21. In embodiments of the invention having circuit interrupters 65 disposed at the rear wall, a vertical compartment 75 is likewise disposed for the same purpose as the compartment 67.

As shown more particularly in FIG. 2, the upper ends of the bus bars 59, 61, 63 are attached to separate horizontal buses 77, 79, 81, respectively, by suitable fastening means, such as similar pairs of bolts 83. The bus bars 59, 61, 63 extend vertically and substantially throughout the length of the vertical cabinet 13, whereby access to one or both sides thereof may be had by insertion of the several circuit interrupters 65 into appropriate compartments. As shown in FIG. 3, the bus bars 59, 61, 63 are preferably Z-shaped and consist of oppositely disposed flanges or legs 87, 89 at intermediate portions 91. The electrical capacity of the bus bars 59, 61, 63 may be increased by attaching metal bar members to the bus bars, such as in surface-to-surface contact with the intermediate portions of each bus bar. The flanges or legs 87 extend toward the front side and the legs 89 extend toward the rear side of the cabinet 13, while the intermediate portions 91 are preferably aligned and in a zone parallel to the front and rear sides of the cabinet. Accordingly, each circuit interrupter 65 is provided with similar terminal contact connectors or clips generally indicated at 93 which move into contact with corresponding stabs 87. Although the copper bus bars 59, 61, 63 are preferably Z-shaped conductors, the bus bars may also be of other shapes, such as L, flat, and O, as shown in FIGS. 6-22. As shown in FIG. 2, each circuit interrupter 65 comprises a pair of mounting members 66 which extend from each opposite side wall and engage similar mounting tracks 68, which tracks may depend from the adjacent horizontal shelf 23, or may be separate from the shelves 23 and be mounted on adjacent frame members such as upright posts 41 and 49.

The bus bars 59, 61, 63 are mounted within a pair of insulators 95, 97. Plug-in type interrupters 65 are connected to the bus bars from the front and rear sides of the cabinet 13. As shown more particularly in FIG. 3, the insulator 95 is a substantially sheet-like member extending between a flange 105 on the left and a flange 107 on the right. To prevent sparkover or arcing from surface creepage between adjacent pairs of bus bars 59, 61, 63, the insulators include interfitting means between each pair of bus bars, which means comprise a flange 111 that projects transversely from the planar surface of one insulator 95 and 97 into a U-shaped member or flange-receiving groove 113 extending from the planar surface of the other of the insulators 95 and 97.

The insulators 95, 97 are identical in construction so that the interfitting flange and groove 111, 113, as well as the U-shaped ribs enclosing the flanges or legs 87, 89, provide a labyrinth passage between one side or flange 105 and the other side or flange 107 of the assembly. It is noted that the labyrinth assembly of the insulators and bus bars is maintained notwithstanding the thickness of the bus bars, thus ensuring required surface creepage distances.

In accordance with this invention each insulator 95, 97 is provided with a plurality, preferably three, of vertically extending ribs 115, 117, 119 of U-shaped cross section into which the flanges or legs 87, 89 extend. In addition, a corresponding number of ribs 121, 123, 125, are disposed in the insulators on opposite sides of the ribs 115, 117, 119 when the insulators are assembled. The ribs 121, 123, 125 likewise have U-shaped cross sections which are aligned with the ribs 115, 117, 119.

Figures 4, 5:
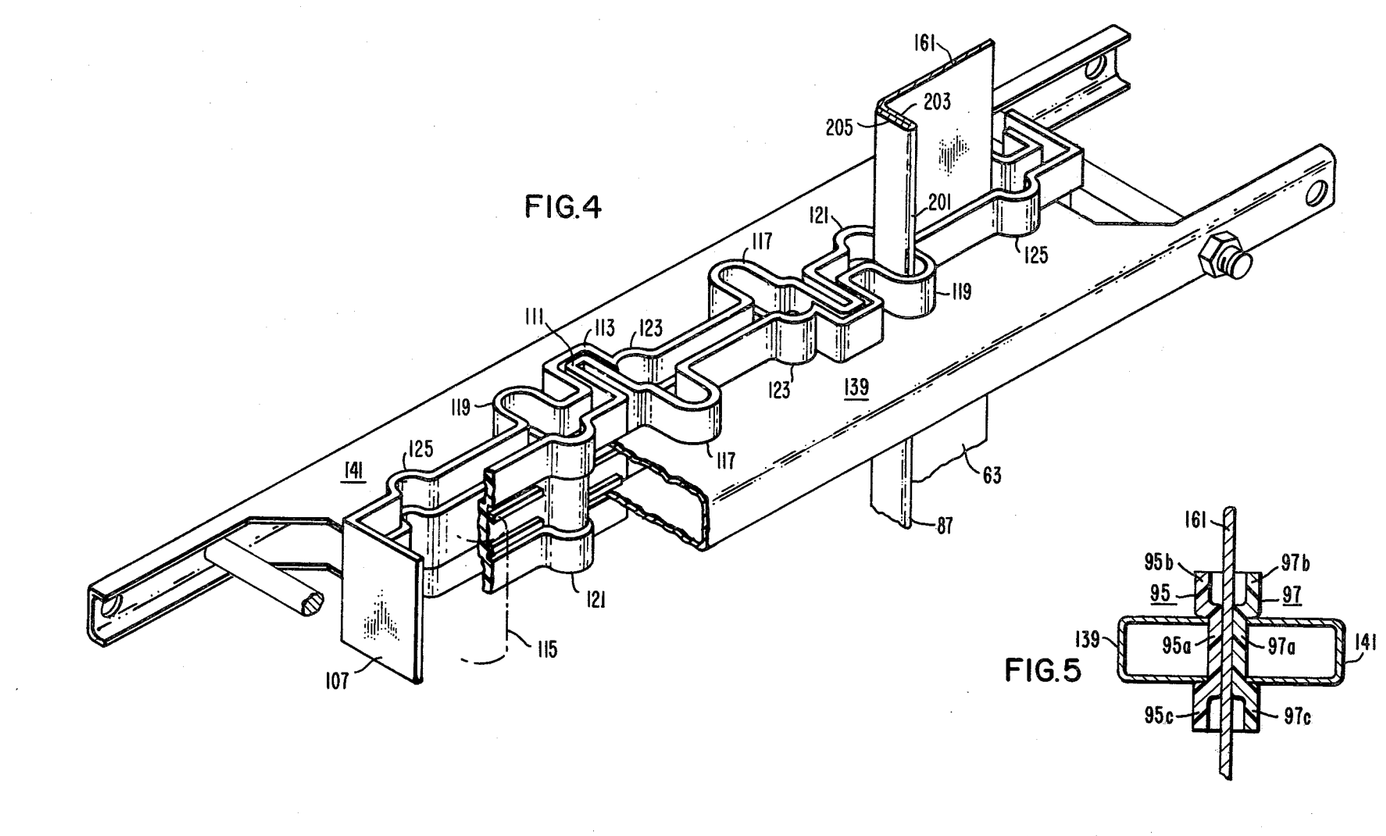
FIG. 4 is a perspective view of an assembly of the insulators with one L-shaped bus bar in place.
FIG. 5 is a fragmentary vertical sectional view, taken on the line V—V of FIG. 3.

As shown in FIG. 5, each insulator 95, 97 includes an intermediate portion 95a, 97a, respectively, which is clamped by the braces 139, 141 tightly against the bus bar 161. In addition, upper and lower flanges 95b, 97b and 95c, 97c are disposed away from the bus bar 161 to provide additional creepage surfaces in the areas adjacent to the bus bar.

Figure 6:
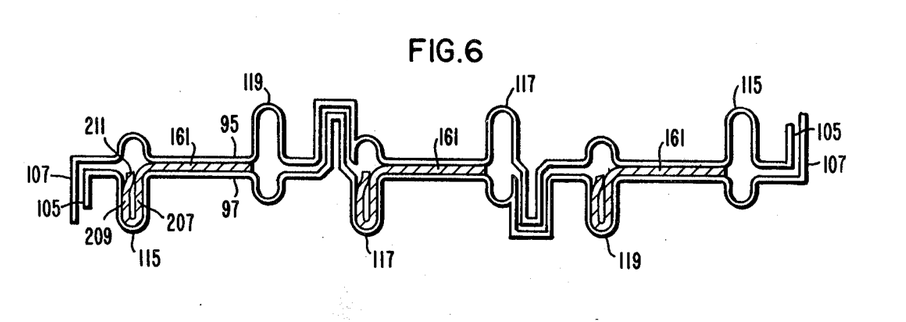
FIGS. 6–17 are horizontal sectional views showing various types of bus bars which can be used with the same pair of insulators.

As shown in FIGS. 6-17, the insulators 95, 97, by being provided with the ribs 121, 123, 125 are usable with a plurality of bus bars of many shapes and combinations. For example, bus bars of various configurations including L, Z, flat, cross, circular, are accommodated by the universally adapted insulators 95, 97. In FIG. 6 three L-shaped bus bars 161 are disposed between the insulators 95, 97. The bus bars 161 are rolled from sheet metal stock.

Figure 7:
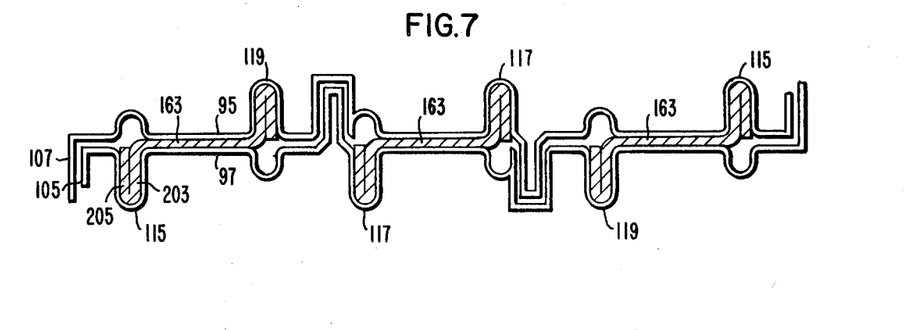

In FIG. 7 a Z-shaped bus bar 163 is disposed at three equally spaced positions, which bus bars are roll-formed from sheet metal stock.

Figure 8:
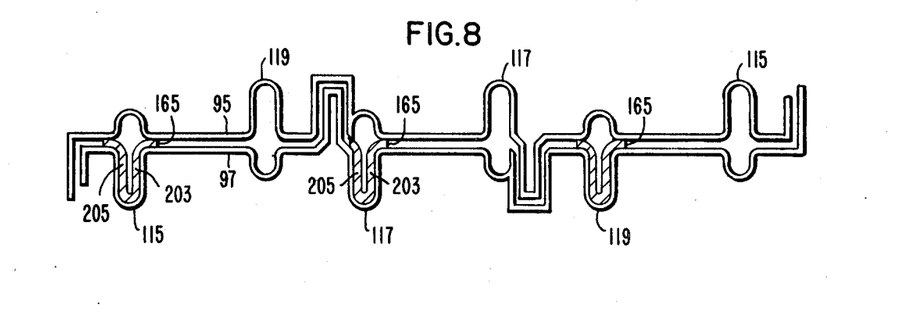
Figure 9:
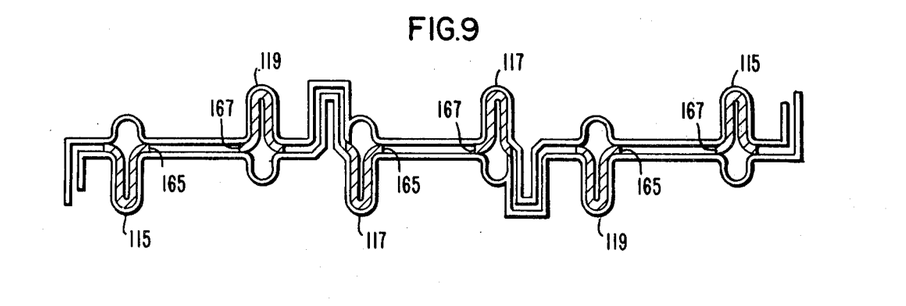

In FIG. 8 three spaced bus bars 165, being roll-formed from sheet metal stock, are disposed in the spaced ribs 115, 117, 119 of the insulator 97. In addition, as shown in FIG. 9 an additional set of three bus bars 167 are disposed in the ribs 115, 117, 119 of the insulator 95.

Figure 10:
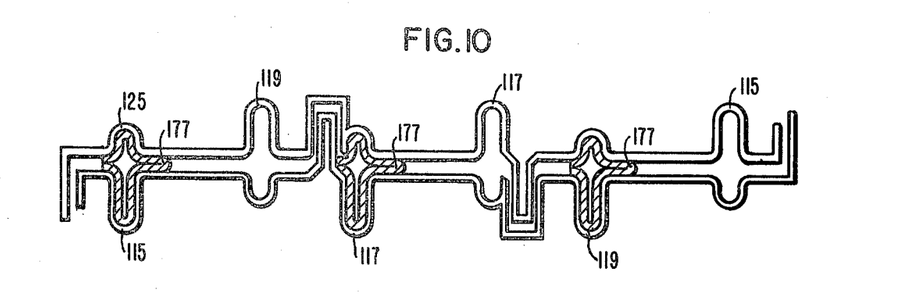
Figure 11:
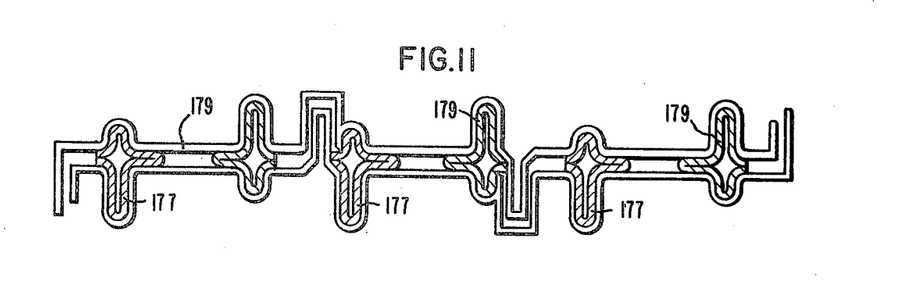
Figure 14:
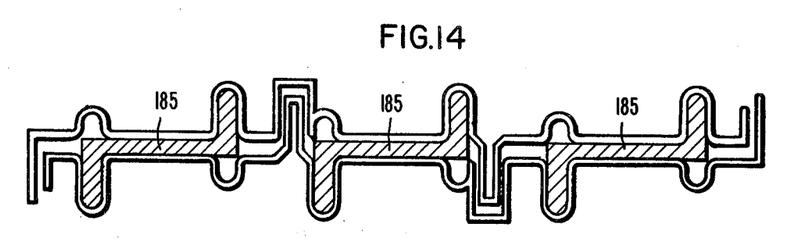

In FIGS. 10 and 11 three spaced bus bars 177 are separately disposed between the corresponding ribs, such as the ribs 115, 125, either separately or with an additional set of bus bars 179 (FIG. 14). Both sets of bus bars 177, 179 are roll-formed from sheet metal stock in a manner similar to the bus bars 173, 175.

Figure 12:
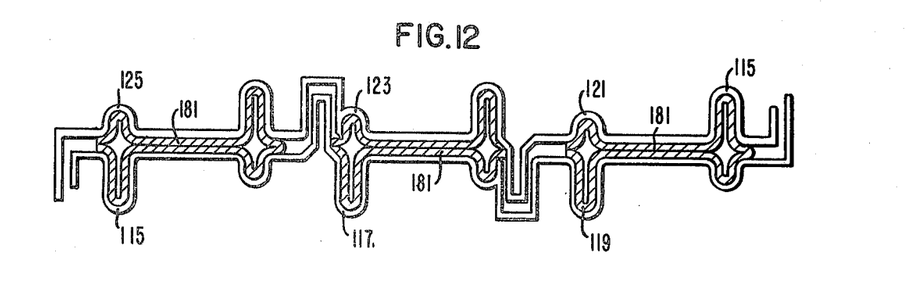
Figure 13:
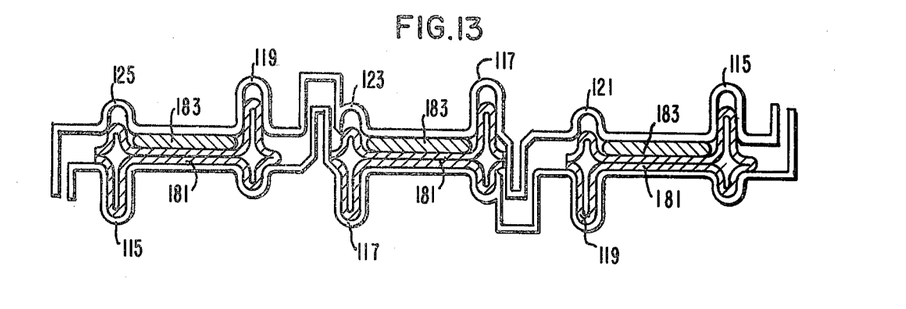

In FIGS. 12 and 13 three bus bars 181 are provided, either separately (FIG. 12), or together with an extra current carrying bar 183 (FIG. 13). As shown the bus bars 181 are roll-formed and disposed in and between adjacent pairs of ribs, such as the ribs 115, 125 and 119, 121.

In FIG. 14 three Z-shaped bus bars 185 are mounted in the insulators 95, 97. The bus bars 185 differ from the bus bars 163 in that the former are extruded rather than roll-formed.

Figure 15:
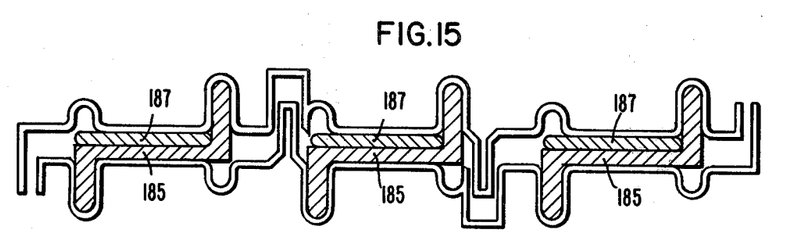

In FIG. 15 three Z-shaped bus bars 185 are provided with an additional flat load carrying bar 187 clamped between the insulators 95, 97. Even with the addition of the bars 187 the interfitting flanges 111 and grooves 113 still provide isolation between the several bus bar assemblies.

Figure 16:
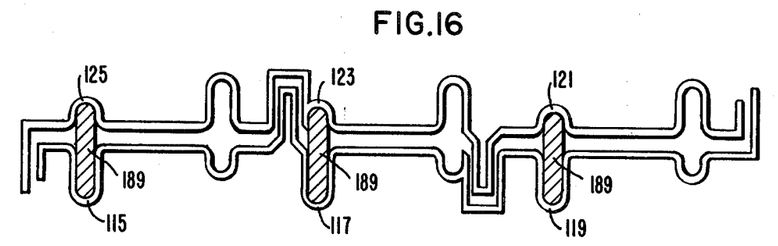

In FIG. 16 three spaced flat bus bars 189 are disposed between corresponding pairs of ribs 115, 125 and 117, 123, and 119, 121. Manifestly, the ribs 121, 123, 125 are available for the flat bus bar 189.

Figure 17:
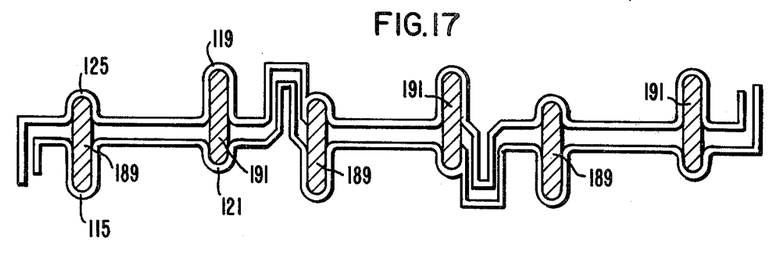

In FIG. 17 an additional set of bus bars 191 are provided between corresponding ribs 119, 121. Thus, the insulators 95, 97 are adapted to accommodate six flat bus bars 189, 191, or only three bus bars 189 as shown in FIG. 16.

Figure 18:
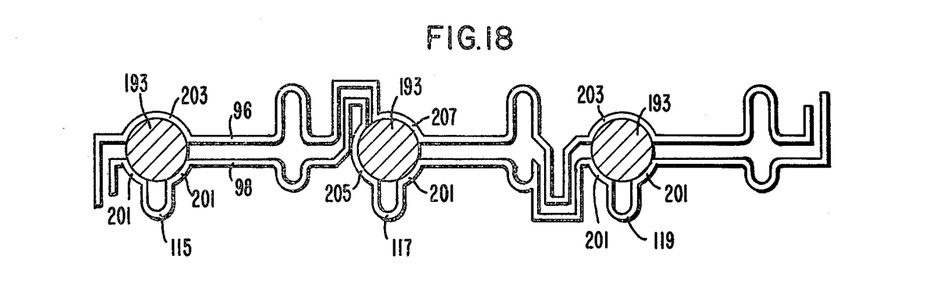
FIGS. 18–21 are horizontal sectional views showing insulators of a modified form to accommodate circular bus bars.
Figure 19:
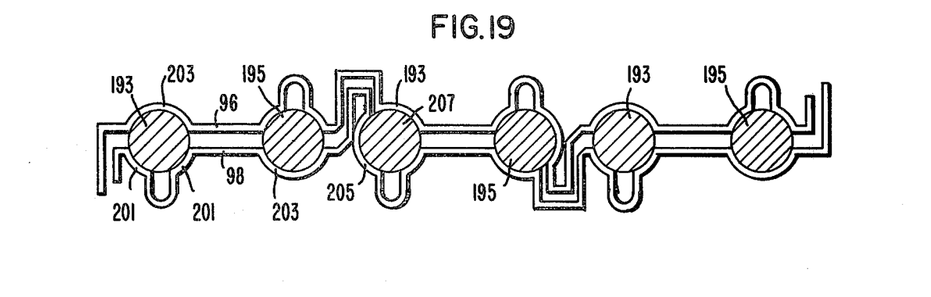
Figure 20:
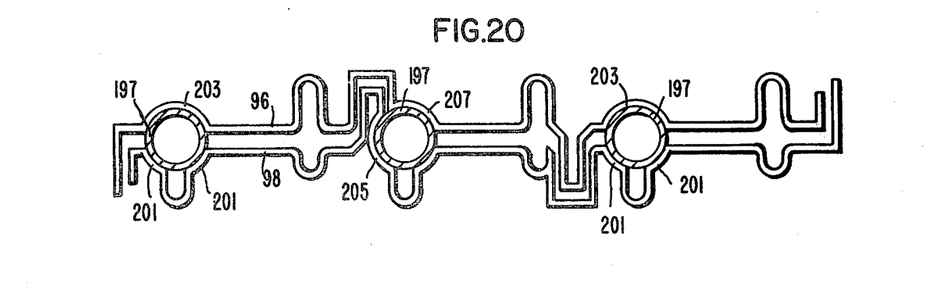

In FIGS. 18-21 a pair of insulators 96, 98 are in conjunction with three round bus bars 193 (FIG. 18), or with six bus bars 193 and 195 (FIG. 19). The bus bars 193, 195 are solid.

Figure 21:
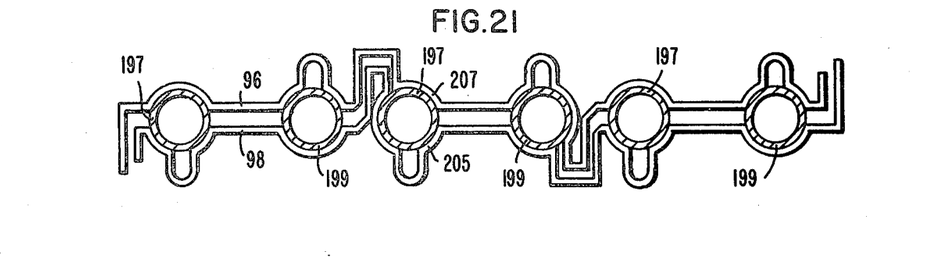

Similarly, three tubular bus bars 197 (FIG. 20) are provided with the insulators 96, 98, or with six tubular bus bars 197 and 199 (FIG. 21). To accommodate the round bus bars 193-199, the insulators 96, 98 have circular grooves 201, 203 as well as circular portions 205, 207 of the ribs 115a, 117a, 119a (FIG. 18). Similar modifications are made in the insulators 96, 98 in the remaining FIGS. 19, 20, and 21 to accommodate either three or six round bus bars 193-197.

The insulators 95, 97 consist essentially of a thermo setting resinous material selected from the group consisting of polyester, epoxy, phenol and mixtures thereof. A suitable material is isophthalic maleic-glycol polyester. The resin also includes a filler selected from the group consisting of alumina, aluminum trihydrate, beryllium oxide, calcium carbonate, mica, silica, talc, and mixtures thereof. Glass is used for reinforcement. The insulators have a minimum thickness of about 0.1 inch. A satisfactory commercial material is Rosite 3550 FM, which is a trademark of the Rostone Company of Lafayette, Indiana.

The assembly of the insulators 95, 97 and the bus bars 59, 61, 63 is supported by the horizontal braces 139, 141 (FIGS. 3, 4). The end portions of the brace 139 are secured by bolts 143 to the support post 53 and the brace 141 is secured to the brace 139 by bolts 145. Several pairs of the braces 139, 141 are disposed at vertically spaced intervals along the length of the assembly of the insulators and bus bars. The brace 139 includes a bar 147 and a channel member 149 secured thereto in a suitable manner, such as welding, riveting or it may be a one-piece assembly.

Accordingly, the device of this invention provides a pair of insulators which are universally applicable to the bus bars of different cross-sectional configurations.

What is claimed is:

1. A control center for distributing electric power from a power supply source to power consuming devices, comprising a cabinet having a plurality of vertically spaced compartments on the front side of the cabinet, a plurality of vertical, horizontally spaced, bus bars in said cabinet, insulating means mounting the bus bars with the surfaces of each bus bar being in surface-to-surface contact with the insulating means, the insulating means comprising a sheet-like member on each side of the spaced bus bars which members have interfitting portions including a flange-receiving groove in one member and a flange in the other member and said interfitting portions extending between each pair of adjacent bus bars, a circuit interrupter structure in at least one compartment and movable transversely into and out of position adjacent to the bus bars, each bus bar comprising a portion disposed in a plane aligned with the direction of movement of the circuit interrupter, said structure comprising a contact member engaging a bus bar, each sheet-like member also comprising wall means forming horizontally spaced vertical ribs extending away from the other sheet-like member, the vertical ribs in one sheet-like member being aligned with the vertical ribs of the other member, each pair of aligned ribs forming a vertical chamber receiving said bus bar portion, and said bus bar portion in at least one of said ribs wherein one rib of a pair of aligned ribs extend further on one side of one sheet-like member than the other rib of said pair extends on the opposite side of the other sheet-like member, and whereby said ribs on said sheet-like members can accomodate bus bars of many different shapes.

2. The control center of claim 1 in which each bus bar comprises an L-shaped cross section including a body portion and a leg with the body portion extending between the sheet-like members, and the leg disposed in one of each pair of ribs.

3. The control center of claim 1 in which each bus bar comprises a Z-shaped cross section including a body portion and two legs with the body portion extending between the sheet-like members, one leg disposed in one of each pair of aligned ribs, and the other leg disposed in an oppositely extending rib of a different pair of ribs.

* * * * *